Jan. 15, 1924.

C. I. HALL 1,480,902

THERMOSTATIC CONTROL DEVICE

Filed Nov. 12, 1920

Inventor:
Chester I. Hall,
by *Albert G. Davis*
His Attorney.

Patented Jan. 15, 1924.

1,480,902

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

THERMOSTATIC CONTROL DEVICE.

Application filed November 12, 1920. Serial No. 423,702.

*To all whom it may concern:*

Be it known that I, CHESTER I. HALL, a citizen of the United States, residing at Fort Wayne, county of Allen, State of Indiana, have invented certain new and useful Improvements in Thermostatic Control Devices, of which the following is a specification.

My invention relates to thermostatic control devices and has for its object the provision of improved means for controlling electric switches in response to temperature changes in a reliable, simple, and efficient manner.

More specifically my invention relates to the thermostatic control devices for regulating the temperature of electric ovens altho it has other applications. It has previously been the practice in devices of this character to employ small platinum or silver contacts operated by means of a small thermostatic metal element within the oven, which contacts act as a relay to control an electrically operated switch without the oven. By reason of the plurality of contacts necessarily involved and the delicacy of the device a great deal of trouble has been experienced.

I obtain a device which is simple, reliable and free from the defects inherent in previous devices by using a thermostatic metal element of very heavy construction which is arranged to operate directly a switch connected in the heating circuit. By making the thermostatic element of rugged construction I not only obtain greater reliability in the thermostatic element itself, but I am enabled thereby to obtain sufficient force in the movement of the thermostatic element to operate a snap switch, which provides a means of well known reliability for controlling the heating circuit. I also provide yieldable means for protecting the thermostatic element against permanent set due to excessive strains set up therein when the oven cools from a high temperature or when the thermostatic element is adjusted when cold to a high temperature setting. Other objects and features of my invention will appear in the course of the following specification in which I have shown my invention embodied in concrete form for the purpose of illustration.

Figure 1:
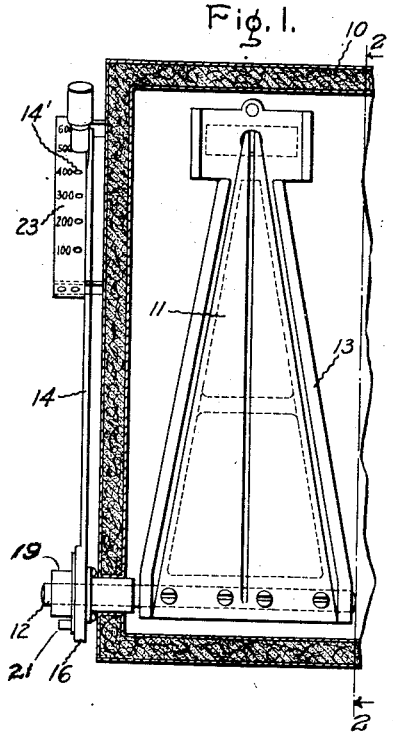
Figure 2:
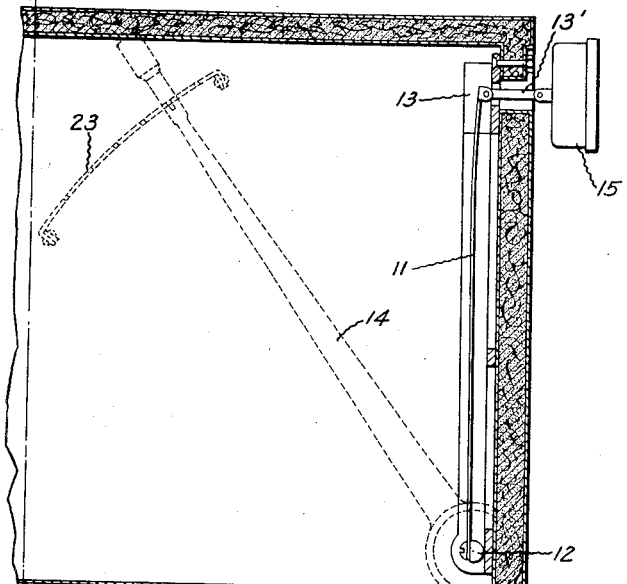

In the accompanying drawing, Fig. 1 is a fragmentary section view on the line 1—1 of Fig. 2, looking in the direction of the arrows, showing an oven equipped with a thermostatic control device embodying my invention; Fig. 2 is a fragmentary section view along the line 2—2 of Fig. 1 looking in the direction of the arrows; and Fig. 3 is an enlarged view in section of the yieldable connection between the thermostatic element and the adjusting device.

Referring to the drawing, a thermostatic metal element 11 is constructed of a heavy tapered strip of thermostatic metal preferably split throughout its operative length into two parts and is rigidly attached at the lower end by screws, or other means, to a shaft 12 which is journaled to turn freely in the support 13 attached to an inner wall of an electric oven 10 of any well known construction. The thermostatic element is tapered to a narrow width at the upper end where it is operatively attached by a pin and link connection 13" to a snap switch 15, which may be of standard construction, supported in a suitable manner without the oven and included in the heating circuit of the oven. Shaft 12 extends through the wall of the oven where it is held against rotation by an arm 14 which is arranged to be adjusted over a sector 23 calibrated in degrees. Movement of the arm 14 over the sector 23 will turn the shaft 12 thus changing the position at which the thermostatic element is held and providing a method of adjusting the thermostatic element to operate the snap switch at any desired temperature. It will be observed that if the shaft 12 were free to turn, the thermostatic element would be free to respond to changes in temperature without in any way affecting the snap switch.

Changes in temperature will affect the thermostatic element to deflect the upper end thereof in a lateral direction. Upon a decrease in oven temperature below the value for which the device is set, the upper end of the thermostatic element will move toward the wall of the oven and close the snap switch; while upon an increase in oven temperature above the value for which the device is set, the upper end of the thermostatic element will move in the opposite direction and open the snap switch.

Figure 3:
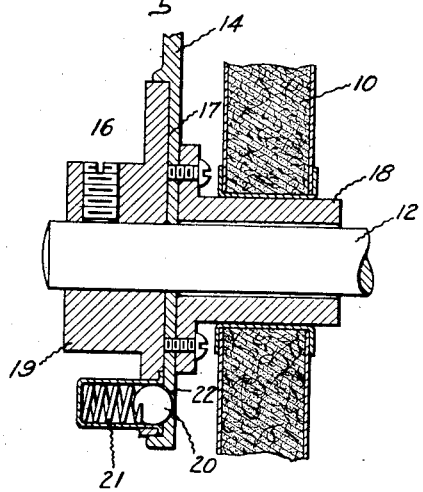

For the purpose of providing a slip connection or coupling 16, shown in detail in Fig. 3, between the arm 14 and the shaft 12, the lower end of arm 14 is enlarged to form a flat circular portion, having a smooth face 17, which is attached to a bushing 18 mounted to turn in the wall of the oven and on the shaft 12. A flange 19 is rigidly attached to the shaft with its inner surface in engagement with face 17 and is provided with a ball 20, pressed against face 17 by means of a spring 21, which normally engages a depression 22 in the face 17. The tension of the spring 21 is so adjusted that the torque necessary to disengage the ball from the depression to permit movement between the flange and the face 17 is somewhat greater than the torque exerted by the thermostat on shaft 12 in operating the snap switch. After the ball has been moved out of the depression, the engagement, due to friction, between the flange and face is very slight. The arm 14 is held in any desired position by means of a spring pin or similar device which engages holes or depressions 14' in the sector.

As thus constructed and arranged and with the parts in position as shown in the drawing, the arm 14 is set to maintain an average temperature in the oven of 500° as indicated on the sector. When the temperature increases to a certain maximum value, for instance, to 510°, the upper end of the thermostatic element will move away from the wall of the oven, or to the left as shown in Fig. 2, and open the snap switch to cut out the heating element. The heating element will now remain inoperative until the temperature in the oven has decreased to a certain minimum value, for instance, 490°, when the thermostatic element will be affected to move toward the oven wall, or to the right as shown in Fig. 2, and close the snap switch, thus closing the circuit to the heating element. The device will operate in this manner, maintaining an average temperature of 500° until the heating circuit is opened by an external switch at some other point. When the heating circuit has been opened and the oven cools to normal room temperature, it will be seen that the upper end of the thermostatic element will be held in a fixed position by the link connection after it has closed the snap switch. As a result further distortion in the thermostatic element as the oven cools will set up an excessive torque in shaft 12 in a direction tending to move arm 14 to off position. If the device has been set to operate at high temperatures this distorting force in the thermostat, as the element cools, would be great enough to cause a permanent set in the thermostatic element were it not for the slip connection which will allow relative movement between shaft 12 and arm 14 after the thermostat exerts a force somewhat greater than that necessary to operate the snap switch. After shaft 12 has been released by the slip connection, the thermostat is free to flex in response to further decreases in temperature. It will thus be observed that when the oven has cooled the snap switch will stand in closed position and flange 19 will be angularly displaced with relation to face 17, the amount of this displacement obviously depending upon the temperature setting given to arm 14. Assuming that it is now desired to start the oven, the heating circuit may be closed by closing the external switch, since the snap switch was operated to closed circuit position as the oven cooled off. As the temperature of the oven rises, the upper end of the thermostatic element tends to move toward the right (Fig. 2) but is prevented by link 13' until it has sufficient force to operate the snap switch. The thermostatic element will therefore rotate shaft 12 in the opposite direction, flange 19 sliping freely with respect to face 17 and carrying ball 20 back toward depression 22. When the spring ball comes into engagement with the depression, which will be at the desired average temperature for which the device is set, the shaft 12 will be held by arm 14 with sufficient rigidity to cause the thermostat to control the snap switch in the manner previously described so as to maintain the predetermined average temperature. It will be observed that the connection will permit slippage in a similar manner when the arm 14 is adjusted to any desired temperature prior to the starting of the oven. By means of the slip connection I therefore protect the thermostatic element against permanent set due to distorting forces set up therein which are greater than the force necessary to operate the snap switch.

Although I have shown a slip connection in the form of a friction coupling, it will be obvious to those skilled in the art that this construction may be varied to suit the conditions under which the device is designed to operate.

In accordance with the provision of the patent statutes, I have described the principles of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:

1. A temperature control comprising a thermostatic element, a support for said element, a control device operated by flexure of said element due to a predetermined change in temperature, and means whereby said support is released to relieve the element of strains due to changes in temperature in excess of said predetermined amount.

2. A temperature control comprising a thermostatic element, a support for one end of said element, a control device operated by movement of the other end of said element due to a predetermined change in temperature, and means for releasing said support whereby said element is relieved of strains due to changes in temperature in excess of said predetermined amount.

3. A temperature control comprising a thermostatic element, a support for one end of said element, a control device operated by movement of the other end of said element due to a predetermined change in temperature, means for adjusting the position of the support to change the temperature setting, and means whereby said support is released to relieve the element of strains due either to changes in temperature in excess of said predetermined amount or to movement of the support to a high temperature setting.

4. A temperature control comprising a thermostatic element, a rotatable support for one end of said element, a control device operated by movement of the other end of said element due to a predetermined change in temperature, means for adjusting the angular position of the support to change the temperature setting, and a slip connection whereby said support is released from the adjusting means to relieve said element of strains due either to changes in temperature in excess of said predetermined amount or to movement of the support to a high temperature setting.

5. A temperature control comprising a thermostatic element, a supporting shaft to which one end of said element is rigidly secured, a control device operated by movement of the other end of said element due to a predetermined change in temperature, an adjustable arm for holding said shaft in any one of a plurality of temperature settings, and a releasable connection between said shaft and said arm whereby said element is relieved of strains due to changes in temperature in excess of said predetermined amount.

In witness whereof, I have hereunto set my hand this eighth day of November, 1920.

CHESTER I. HALL.